US006359761B1

(12) United States Patent
Sid

(10) Patent No.: US 6,359,761 B1

(45) Date of Patent: Mar. 19, 2002

(54) SECONDARY GROUND FAULT PROTECTION

(75) Inventor: Alberto Sid, Upper Saddle River, NJ (US)

(73) Assignee: MAF Technologies, Corp., Upper Saddle River, NJ (US)

( * ) Notice: Subject to any disclaimer, the term of this patent is extended or adjusted under 35 U.S.C. 154(b) by 0 days.

(21) Appl. No.: 09/532,569

(22) Filed: Mar. 22, 2000

(51) Int. Cl.[7] .................................................. H02H 3/00

(52) U.S. Cl. ........................... 361/42; 361/93.6; 361/86

(58) Field of Search .............................. 361/42, 49, 50, 361/35, 86, 87, 93.1, 93.2, 93.5, 93.6; 340/649, 650

(56) References Cited

U.S. PATENT DOCUMENTS 5,892,646 A * 4/1999 Parker et al. ................. 361/42
6,040,778 A * 3/2000 Hopkins et al. ............ 340/650
6,104,585 A * 8/2000 Matsui et al. ................. 361/38

* cited by examiner

*Primary Examiner*—Michael J. Sherry
(74) *Attorney, Agent, or Firm*—Notaro & Michalos P.C.

(57) ABSTRACT

A secondary ground fault protection for a high voltage power supply has a high voltage transformer with a center tapped secondary coil. The primary coil of a monitoring transformer is connected to the secondary coil at the center tap, which is approximately the midpoint of the secondary coil. The power supply load is connected across the end terminals of the secondary coil. The monitoring transformer is connected between the center tap and an earth ground on the primary coil side and between sensing circuitry and a digital ground on the secondary side. The sensing circuitry includes sub-circuits to generate various outputs which indicate the presence of faults, including a floating ground, excessive fault current or an open sensor transformer. The circuit outputs can be combined using a logical OR gate to cause specific actions in response to each detected fault, including terminating the high voltage generation in response to an excessive fault current. The fault detection circuit includes binary inputs for indicating what load is being powered by the power supply so that the ground fault sensing is more accurate and effective.

24 Claims, 4 Drawing Sheets

SECONDARY GROUND FAULT PROTECTION

FIELD AND BACKGROUND OF THE INVENTION

The present invention relates generally to the field of ground fault interrupt protection for electrical power supplies and in particular to a new and useful ground fault protection for the secondary coil of a high voltage transformer. The ground fault protection is especially useful for power supplies used to power lighting applications through a high voltage transformer, such as a neon lighting display.

Ground fault protection circuits for lighting display power supplies are generally known in the art. U.S. Pat. No. 5,751,523, for example, discloses a power supply for neon lamps having a transformer with a return path that is separate from the earth ground, which permits detection of a fault current. The primary coil is connected to a power source. A load, such as gas discharge tubes, is connected across the secondary coil end terminals. The mid-point of the secondary coil of the power supply is connected to one side of a secondary ground fault protection circuit and to ground. The secondary ground fault protection circuit is also connected to the primary coil terminals. The secondary ground fault protection circuit includes a relay for breaking the connection to the AC power source connected to the primary coil when a ground fault is detected.

Other patents disclosing power supplies having fault protection include U.S. Pat. Nos. 5,387,845, 5,841,239, 5,241,443, 4,507,698 and 3,666,993.

In certain cases, different gas pressures and types of gas discharge tubes, such as neon gas tubes, can present different amplitude loads to power supplies. In the case of a system where the color generated by a gas discharge tube may be changed by changing the voltage amplitude, frequency and/or duty cycle supplied to the tube, a power supply which is operating safely when driving tubes generating a yellow color may be subject to faults when a blue color is generated using the same power supply instead.

There is a need for a ground fault protection circuit for a power supply having a sensing circuit which can detect ground faults, a bad sensing circuit and floating grounds while distinguishing between different amplitude loads.

SUMMARY OF THE INVENTION

It is an object of the present invention to provide a secondary ground fault protection for a power supply transformer having fault sensing circuitry capable of indicating and reacting to different fault conditions.

It is a further object of the invention to provide a secondary ground fault protection which can verify the function of the sensing transformer and the security of the earth ground connection.

It is yet another object of the invention to provide a secondary ground fault protection for terminating both hardware high voltage generation and power supply software power generation instructions.

A further object of the invention is to provide a ground fault protection for a power supply used to power a changing load.

Accordingly, a secondary ground fault protection for a high voltage power supply is provided having a high voltage transformer with a center tapped secondary coil. The primary coil of a monitoring transformer is connected to the secondary coil at the center tap, which is approximately the midpoint of the secondary coil. The power supply load is connected across the end terminals of the secondary coil.

The monitoring transformer is connected between the center tap and an earth ground on the primary coil side and between sensing circuitry and a digital ground on the secondary side. The sensing circuitry includes sub-circuits that can generate outputs indicating the presence of faults, including a floating ground, excessive fault current or a defective sensor circuit. The sub-circuit outputs can be connected to cause specific actions in response to a particular fault, such as terminating the high voltage generation in response to an excessive fault current. The ground fault detection circuit includes inputs for indicating what load is being powered by the power supply. The ground fault sensing is made more accurate and effective by using a threshold comparison voltage corresponding to the load being powered.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
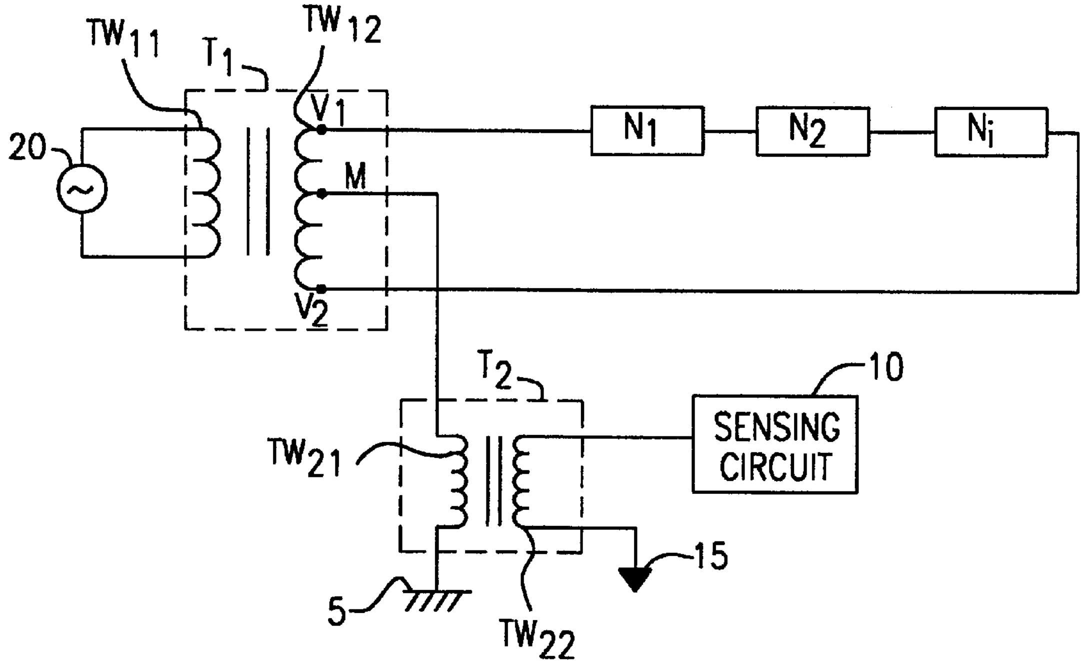
FIG. 1 is a schematic circuit drawing of the connection between the power transformer and a monitoring transformer according to the invention.

Referring now to the drawings, in which like reference numerals are used to refer to the same or similar elements, FIG. 1 shows a schematic drawing of a power supply high voltage transformer T1 connected to a series of loads, such as neon tubes N1, N2 . . . Ni, and the primary coil TW21 of a ground path sensing transformer T2. The loads N1 . . . Ni are connected across the end terminals V1, V2 of the secondary coil TW12 of high voltage transformer T1. The primary coil TW21 of sensing transformer T2 is connected between a center tap at the midpoint M of high voltage transformer T1 secondary coil TW12 and earth ground 5. The primary coil TW11 of the high voltage transformer T1 is connected to a power source 20.

The secondary coil TW22 of the sensing transformer T2 is connected between a sensing circuit 10 for detecting different fault conditions, and a digital ground 15.

Sensing transformer T2 has a coil turn ratio of 1:1, in order to isolate the sensing circuitry 10 from the secondary coil TW12. Due to the coil turn ratio, any changes in the ground path in the high voltage transformer T1 will be represented nearly identical in ground path sensing transformer T2.

In normal operation (no fault conditions), the neon tube loads N1 . . . Ni will generate light. Since the loads N1 . .

. Ni are isolated from ground 5, there will be no current flowing through the center tap M or to the primary coil TW21 of sensing transformer T2. The voltage V1–V2 is preferably about twice V1-M and V2-M.

Figure 2:
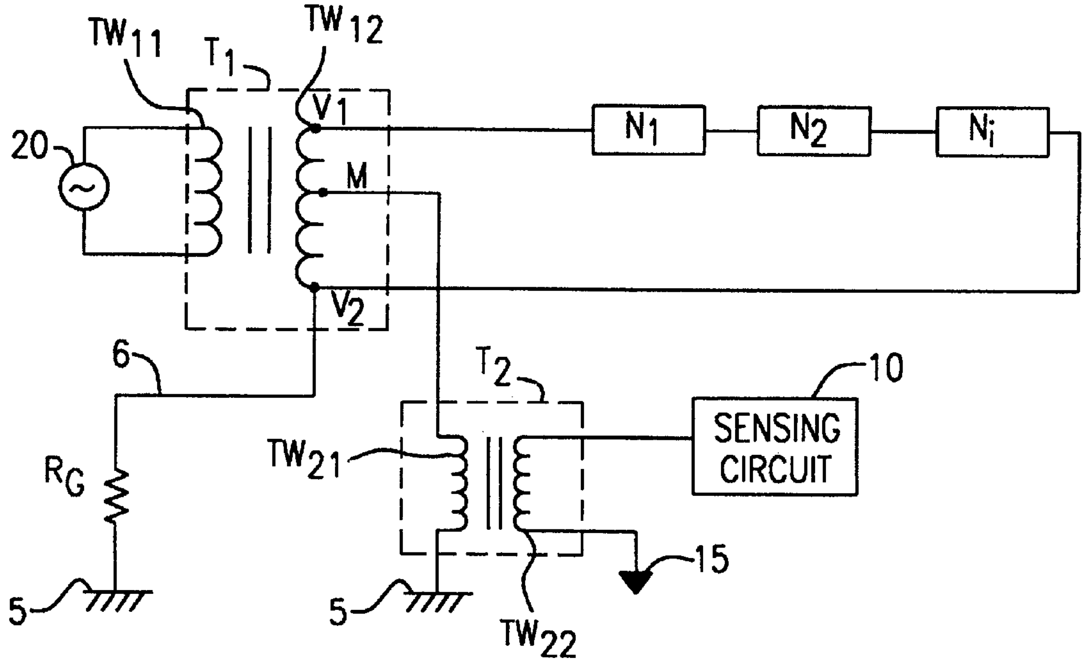
FIG. 2 is a schematic circuit drawing of a ground fault situation in the circuit of FIG. 1.
Figure 3:
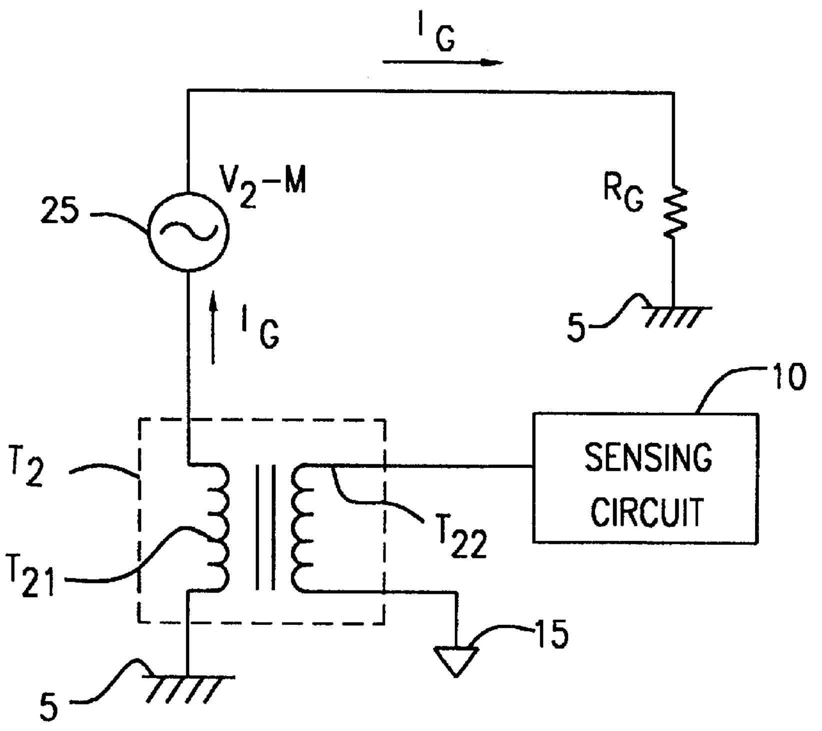
FIG. 3 is a schematic circuit drawing showing an equivalent circuit to the one in FIG. 2.

Referring now to FIG. 2, if a ground path is closed, such as the secondary ground fault 6, through a resistance $R_G$, the resulting circuit can be modeled by the equivalent circuit of FIG. 3.

As shown in FIG. 3, a current $I_G$ is created through the sensing transformer T2. A voltage source 25 equivalent to V2-M is created on the high terminal of primary coil TW21 of the sensing transformer T2. Assuming there are no losses in sensing transformer T2, the current is determined by the equation: $I_G=(V2-M)/R_G$ (1) Again, because of the coil turn ratio, the current IG will be represented substantially identical in the secondary coil TW22 of sensing transformer T2. This permits monitoring of the center tap M of the high voltage transformer T1. If a current IG, or other secondary ground fault current is developed, a reaction can be produced depending on the current value. A sensing circuit 10 connected to the secondary coil TW22 of the sensing transformer T2 can be used to both sense and react to the presence of a ground fault in the high voltage transformer T1.

Figure 4A:
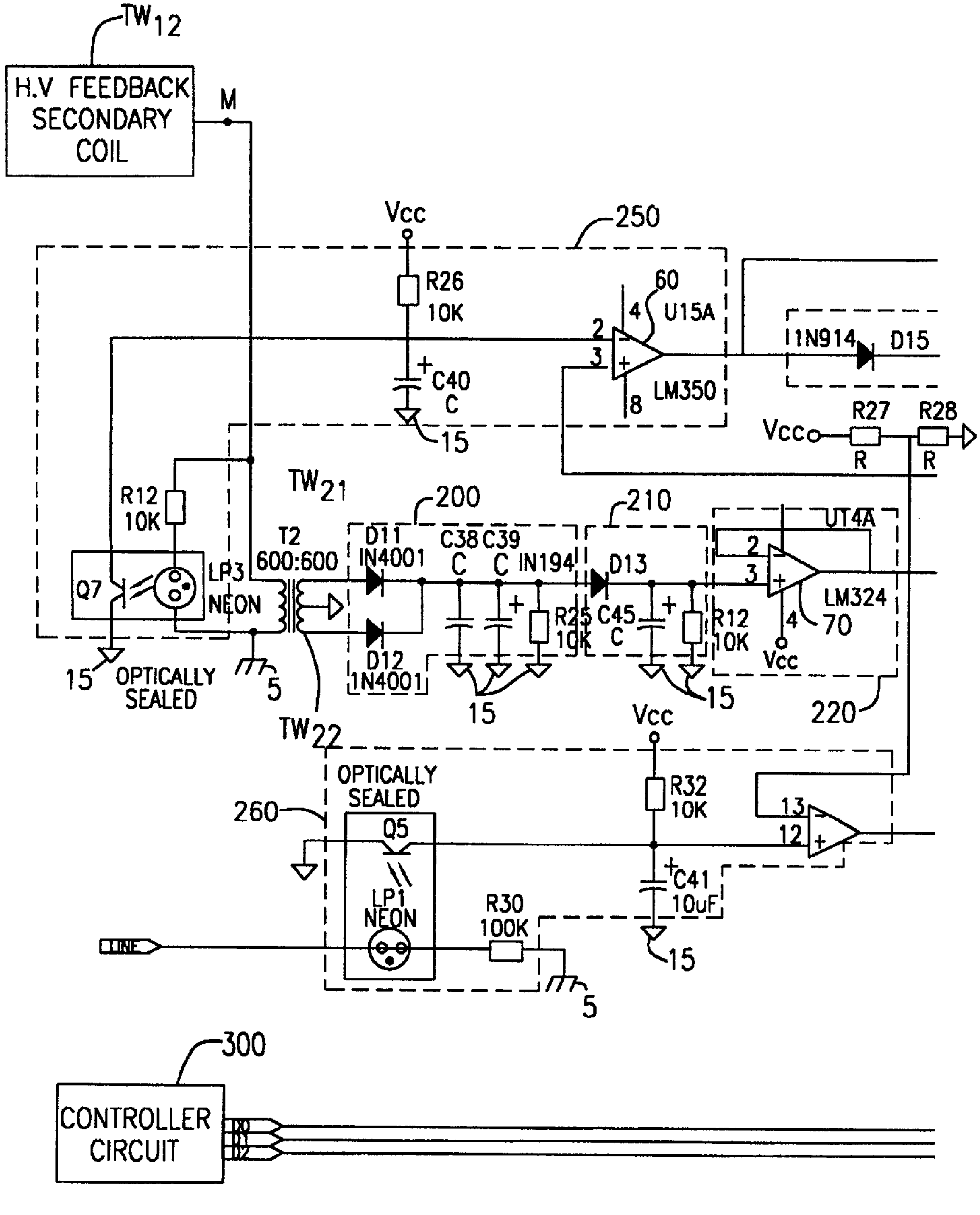
FIGS. 4A and 4B are two halves of a schematic circuit drawing of a sensor circuit according to the invention.
Figure 4B:
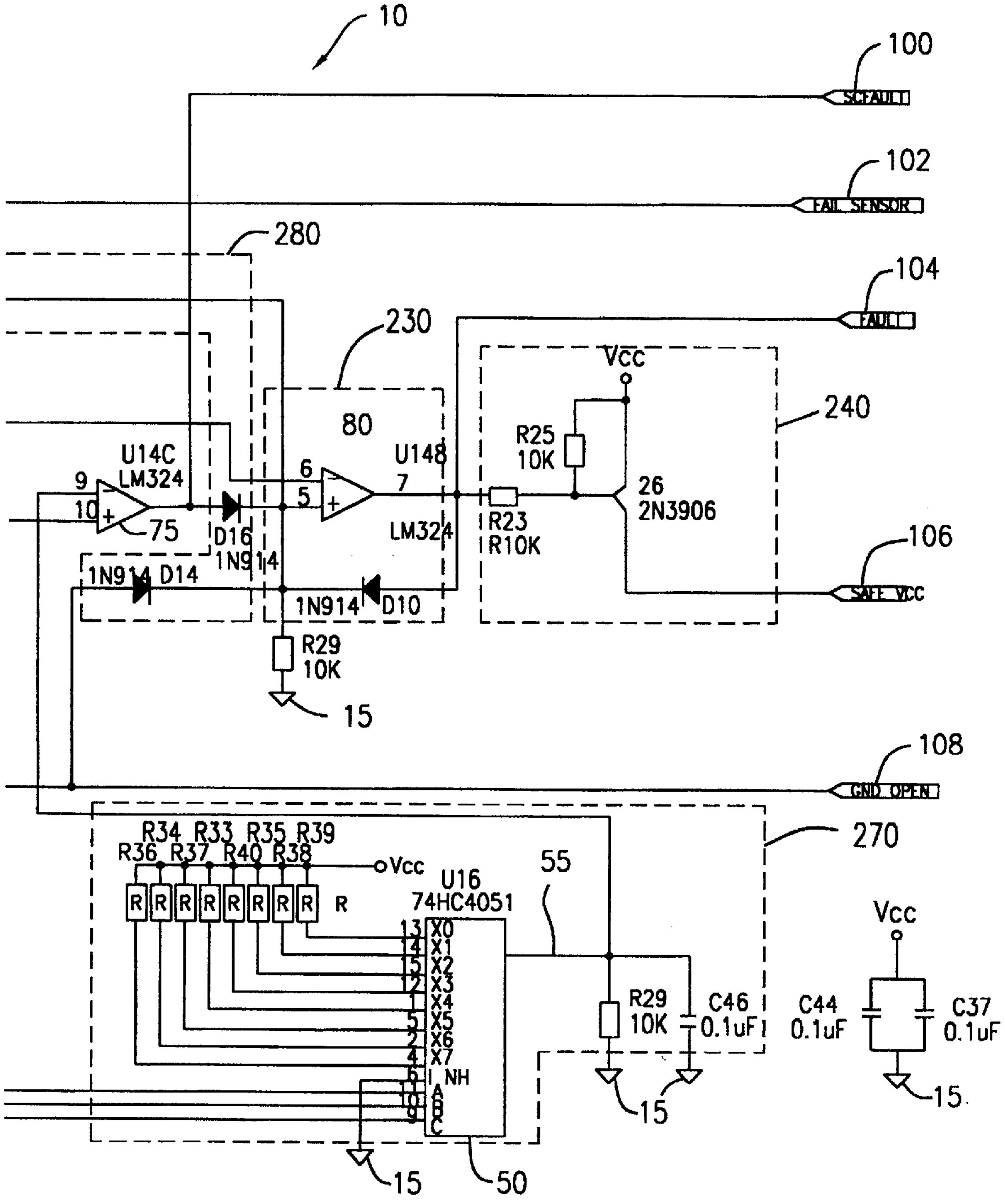

Referring to FIG. 4, a sensing circuit 10 is shown having a different output indicators 100, 102, 104, 106, 108 for displaying different fault conditions connected to the sensing transformer T2. A series of inputs D0, D1, D2 on analog switch 50 are connected to a microprocessor 300 are used to indicate to the sensing circuit 10 what load is present on the high voltage transformer T1.

The components of the sensing circuit 10 shown in FIG. 4 are connected as follows.

A center tap M2 on the secondary coil TW22 of sensing transformer T2 is connected to ground 15. Each terminal of the secondary coil TW22 is connected to an anode of one of rectifying diodes D11, D12. The cathodes of rectifying diodes D11, D12 are connected together to provide full wave rectification of the complex power waveform present on the secondary coil TW22 when a fault occurs. Filter capacitors C38, C39 are connected in parallel between the cathode of diodes D11, D12 and ground 15 as filters for completing the rectification circuit 200, while parallel connected limiting resistor R25 determines the maximum DC amplitude that the fault current will generate for a given current value.

A peak hold circuit 210 has the anode of peak hold diode D13 connected to the cathodes of rectifying diodes D11, D12. Peak hold capacitor C45 and resistor R12 are connected in parallel between the cathode of peak hold diode D13 and ground 15. The cathode of peak hold diode D13 provides an input voltage to the non-inverting terminal of comparator 70, which is used as a voltage follower 220.

The output of voltage follower comparator 70 is connected in a feedback loop to the inverting terminal. Comparator 70 also has power connections to Vcc and ground 15. It should be noted that comparators 70, 75, 80, 85 can all be contained on the same chip, and so power connections are only shown for voltage follower/comparator 70. The voltage follower 220 is used to couple the high impedance circuitry of the rectifier 200 and peak hold 210 circuits to the remainder of the sensor circuit 10.

The output of voltage follower 70 is connected directly to the non-inverting terminal of comparator 75. The inverting terminal of comparator 75 is connected to a reference voltage output 55 generated by reference voltage generator circuit 270.

The reference voltage generator circuit 270 provides a reference voltage output 55 from analog switch 50 based on the binary inputs D0, D1, D2. When three inputs D0, D1, D2 are used, a total of eight combinations are possible, and, therefore, eight different reference voltages 55 can be generated. The ability to selectively choose different reference voltages 55 permits a microprocessor controller 300 which is used to select different known loads to send a binary code input signal using binary inputs D0, D1, D2 corresponding to a particular one of the known loads. In this way, the reference voltage 55 can be adjusted to the known load being supplied power, and in effect, tuned to the particular load.

The analog switch 50 can be one such as a 74HC4051 made by Motorola, having three channel selector inputs A,B,C and a non-inverted output X. Alternatively, a digital-to-analog (D/A) converter can be used for the analog switch 50.

As shown, the inputs D0, D1, D2 are connected to channel selector inputs A, B, C, respectively. One of eight different resistances, R33 through R40, are connected between a fixed reference voltage Vcc and each of eight channel inputs X0–X7. The output reference voltage 55 is determined by voltage division of the fixed reference voltage Vcc across the resistance R33–R40 on the selected channel X0–X7 and series-connected division resistor R41. Capacitor C46 is connected in parallel with division resistor R41 to filter noise components from the output reference voltage 55.

When the non-inverting terminal input voltage of comparator 75 is greater than the applied reference voltage 55, a fault is indicated and the output of comparator 75 is high, or a digital 1. This causes indicator SGFAULT 100 to activate, such as a signal lamp or tone, thereby providing notification that the power supply is producing an RMS ground fault current and generating a corresponding ground fault voltage that is higher than the selected preset output reference voltage 55. The indicator SGFAULT 100 can also be connected to a switch on the power supply controller, such as a CPU (not shown), to stop generating power at the power source 20 connected to the high voltage transformer T1.

As a further result of comparator 75 producing a digital high output, latching circuit 230 is activated by logic diode D16 having its anode connected to the output of comparator 75 conducting the high signal to the non-inverting input of latch comparator 80. In normal (non-fault) operation, the non-inverting input of latch comparator 80 is a digital low. The inverting terminal of comparator is set at Vcc/2, as a result of voltage division of Vcc across matched resistors R27 and R28, which have the same resistance value. Thus, until the voltage applied to the non-inverting terminal of comparator 80 is a digital high, the output will be a digital low.

The high input signal from diode D16 causes the output of latch comparator 80 to also go high. FAULT indicator 104 is connected to latch comparator 80 and is activated by the high output. Latch diode D10 is connected in a feedback loop from the output to the non-inverting input of latch comparator 80. Conducting resistor R29 is connected between the non-inverting input of latch comparator 80 and ground to generate a voltage at the input when any of the diodes D10, D14, D15, D16 are conducting. Latch diode D10 conducts as well when a high signal is present, preventing the sensor circuit 10 from leaving the fault condition, even if the fault is removed, until it is reset by turning the power to the circuit 10 off and back on.

The latching circuit 230 output also controls power switch circuit 240. The power switch circuit 240 has transistor Q6 with the emitter connected to Vcc, the base connected to the output of latch comparator 80 through resistor R23, and the collector connected to SAFEVCC indicator 106. Resistor R24 is connected between the emitter and base of transistor Q6. Transistor Q6 is normally conducting, so that SAFE-VCC indicator 106 is at voltage Vcc When the output from the latching circuit 230 is a digital high, the voltage across resistor R23 cause transistor Q6 to stop conducting, and reduces SAFEVCC indicator 106 to zero. The SAFEVCC indicator 106 can also be connected to a relay for enabling (no fault) or disabling (fault condition) the high voltage power supply to the high voltage transformer T1. The power switch circuit 240 provides hardware safety control for the power supply having the sensor circuit 10.

Thus, the operation of the sensing circuit 10 to detect ground faults and take corrective action to prevent damage to the power supply or loads has been described.

The sensing circuit 10 further includes sub-circuits for detecting a defective sensing transformer 250 and detecting a floating ground 260. Logic diodes D14, D15 and D16, which have their cathodes connected at a common node, create a logical OR gate 280. Thus, if the output of any one of the fault sensing comparator 75, defective sensing transformer circuit 250 or floating ground detection circuit 260 is a digital high, the latching circuit 230 and power switch circuit will be activated, thereby shutting down the power supply until it is reset.

Figure 5:
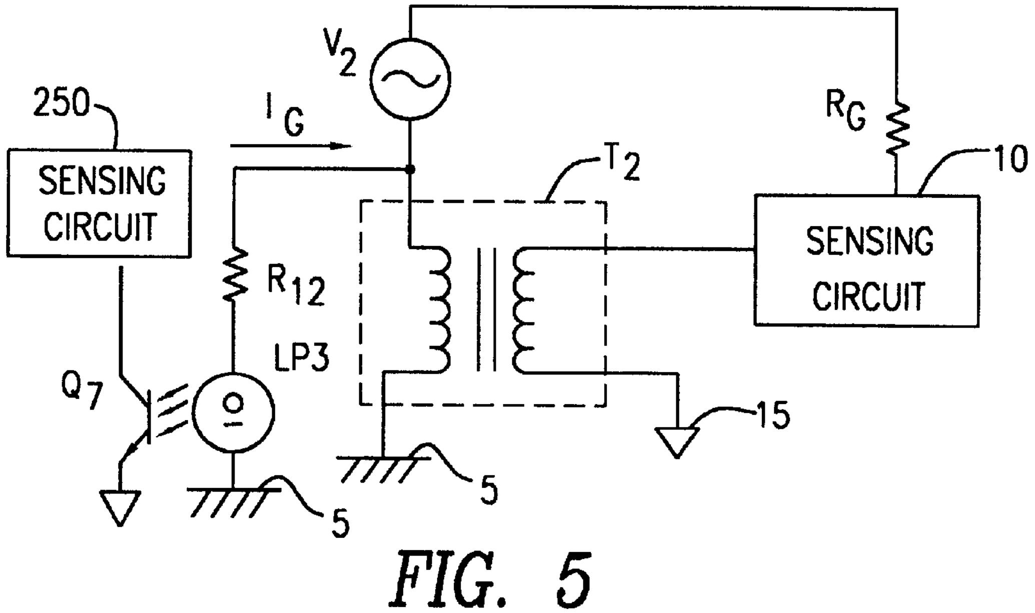
FIG. 5 is a schematic circuit drawing of a portion of the sensor circuit.

With reference to both FIGS. 4 and 5, if the primary coil TW21 of sensing transformer T2 opens, the center tap M of high voltage transformer T1 will be floating. If there is a floating center tap, the sensing transformer T2 and sensing circuit 10 may not detect a secondary ground fault. In order to avoid this condition, the center tap M is also connected to neon lamp LP3 through current limiting resistor R12. The neon lamp LP3 is optically coupled and sealed with phototransistor Q7, having the emitter connected to ground and the collector connected to the inverting terminal of comparator 60.

In non-fault, non-floating center tap operation, no current flows to the neon lamp LP3, and so the phototransistor Q7 does not conduct. When the sensing transformer T2 opens, however, a current and voltage are generated at current limiting resistor R12 which is sufficient to power lamp LP3. Phototransistor Q7 is then placed in the conducting state.

As seen in FIG. 4, the fixed reference voltage Vcc is also connected to the inverting terminal of comparator 60 across current limiting resistor R26. Filter capacitor C40 is used to filter AC components from the voltage input to the non-inverting terminal. The non-inverting terminal of comparator 60 has a voltage equal to Vcc/2 applied to it, so that the inverting terminal voltage is about equal to Vcc, and the output is a digital low, until phototransistor Q7 begins conducting.

Once phototransistor Q7 begins conducting, it creates a short circuit of the voltage Vcc applied to the inverting terminal, dropping it to about zero, and causing the output of comparator 80 to go to a digital high. The high output from comparator 80 causes logic diode D15 to begin conducting and latch circuit 230 and power switch circuit 240 to activate. The output from comparator 80 is also connected to FAIL SENSOR indicator 102, which activates when the output is high. Thus, an open sensing transformer T2 will be detected by the defective sensing transformer circuit 250.

The floating ground protection circuit 260 works in the reverse manner to the defective sensing transformer circuit 250.

A line input LINE powers neon lamp LP1 connected in series with a current limiting resistor R30 and earth ground 5. The light from neon lamp LP1 causes phototransistor Q5 to conduct, thereby shorting reference voltage Vcc connected across resistor R32 to the collector through the emitter to ground 15. A neon lamp and phototransistor are preferred for use instead of an opto coupler due to an Underwriter's Laboratory (UL) limitation, UL-2161, which indicates that maximum ground leak currents should not exceed 0.5 mA. That level of current is not sufficient to power known opto coupler diodes, but can be used to power a neon lamp for use as the switch. Clearly, however, current switches which operate within this limitation can be substituted for the optically coupled neon lamp LP3 and phototransistor Q7. A filter capacitor C41 is connected to the non-inverting terminal. The collector of phototransistor Q5, and reference voltage Vcc, are also connected to the non-inverting terminal of comparator 85. While phototransistor Q5 is conducting, however, the applied voltage at the non-inverting terminal is zero. The divided reference voltage Vcc/2 is applied to the inverting terminal of comparator 85. Thus, when the earth ground 5 is solidly connected, the output of comparator 85 is a digital low, and no current flows through logic diode D14 to the latching circuit 230.

When the earth ground 5 is disconnected, the neon lamp LP1 stops emitting light, causing phototransitor Q5 to stop conducting, thereby applying reference voltage Vcc to the non-inverting terminal of comparator 85. Since the applied voltage at the non-inverting terminal is higher than the Vcc/2 voltage at the inverting terminal, the comparator begins outputting a digital high signal. Logic diode D14 conducts the high signal to the latching circuit 230 and power switch circuit 240, causing the power supply to shut down. The high output from comparator 85 will also activate the GNDOPEN indicator 108 connected to the output.

In one application of the ground fault protection of the invention, in the sensor circuit 10 shown in FIG. 4, the three inputs D0, D1, D2 preferably correspond to one of eight color levels that can be produced using a power supply driving a gas discharge tube, depending on the output voltage of the power supply. The power supply is connected to the sensor circuit 10 via the center tap M on the secondary coil TW12 of the high voltage transformer T2. The inputs D0, D1, D2 are provided by a CPU or other controller circuit 300 based on the color level being output.

It is envisioned that additional sensing circuits can be connected to the latching and power supply circuits 230, 240 using the logical OR gate 280 by connecting the cathode of another logic diode to the common output.

The indicators 100, 102, 104, 106, 108 can each be a different lamp, such as an LED, or they can represent a circuit designed to make a single indicator lamp flash in different patterns or colors to convey the particular fault which has occurred to an operator of the power supply.

In a preferred embodiment, values for the components identified in the circuit of FIG. 4 are as follows. Resistors R12, R23, R24, R25, R26, R29 and R32 can each be 10 kohms. The resistances of R27 and R28 should be equal, and preferably large, such as about 50 kohms each. Values for R33–40 and R40 must be selected based on the loads which will be applied to the power supply. R30 is preferably about 100 kohms, and adjusted to comply to UL-2161 standards. Capacitors C38–C40 and C45 can be any value which sufficiently filters AC components from the circuits. Preferably, the capacitance of C41 is about 10 $\mu$F, and C37, C44 and C46 are each about 0.1 $\mu$F.

Latching diode D10, peak hold diode D13 and logic diodes D14, D15, and D16 are all preferably type 1N914.

Diode type 1N4001 are preferred for rectifying diodes D11, D12. A suitable integrated circuit containing comparators 70, 75, 80 and 85 is a LM324 made by National Semiconductor. An LM358 chip from National Semiconductor is preferred for comparator 60. Vcc is preferably set at about 5V for digital operation, and digital ground 15 is preferably 0V. A BJT transistor type 2N3906 from Motorola can be used for transistor Q6.

While a specific embodiment of the invention has been shown and described in detail to illustrate the application of the principles of the invention, it will be understood that the invention may be embodied otherwise without departing from such principles.

What is claimed is:

1. A secondary ground fault protection circuit for a power supply having a high voltage transformer with a primary coil and a secondary coil, the ground fault protection circuit comprising:

a sensing transformer having a sensing transformer primary coil connected between a center tapped midpoint of the secondary coil of the high voltage transformer and an earth ground and a sensing transformer secondary coil having a second center tapped midpoint connected to a digital ground;

sensing circuit means for detecting a ground fault in the power supply, the sensing circuit means connected to the sensing transformer secondary coil.

2. A circuit according to claim 1, wherein the sensing circuit means further comprises floating ground means for detecting whether the power supply has a good connection to the earth ground and bad transformer means for detecting whether the sensing transformer is operating properly.

3. A circuit according to claim 1, wherein the ratio of coil turns in the sensing transformer is about 1:1.

4. A circuit according to claim 3, wherein the sensing circuit means comprises a reference voltage means for producing a reference voltage and voltage comparison means for comparing a fault voltage representing the voltage in the high voltage transformer to the reference voltage and generating a fault output having a value dependent on the result of the comparison.

5. A circuit according to claim 4, wherein the sensing circuit further comprises rectifying means for rectifying and filtering a complex power voltage from the sensing transformer secondary coil to produce a DC voltage representing the voltage in the high voltage transformer, peak hold means for temporarily producing a constant voltage from a peak value of the DC voltage, and voltage follower means connected between the peak hold means and the peak voltage comparison means for generating the fault voltage and isolating the impedance of the rectifying means and peak hold means from the voltage comparison means.

6. A circuit according to claim 5, wherein the sensing circuit further comprises switch means for shutting down the power supply in response to the fault output from the comparison means indicating a ground fault.

7. A circuit according to claim 6, wherein the sensing circuit further comprises a latch means for preventing the power supply from restarting when a ground fault is indicated unless the power supply is turned off and then turned back on.

8. A circuit according to claim 4, wherein the sensing circuit means further comprises floating ground means for detecting whether the power supply has a good connection to the earth ground and generating a floating ground output and bad transformer means for detecting whether the sensing transformer is operating properly and generating a bad transformer output.

9. A circuit according to claim 8, wherein the sensing circuit further comprises switch means for shutting down the power supply.

10. A circuit according to claim 9, wherein the fault output, floating ground output and bad transformer output are all connected to the switch means via an OR gate.

11. A circuit according to claim 10, further comprising indicator means connected to each of the fault output, floating ground output and bad transformer output for indicating when a fault is detected the type of fault that has occurred in the power supply.

12. A circuit according to claim 11, wherein the indicator means comprises a plurality of LEDs, at least one LED connected to each of the output voltages.

13. A circuit according to claim 4, wherein the reference voltage means comprises one of an analog switch and a digital-to-analog converter having a plurality of input channels each connected to a threshold voltage source, data input means for selecting one of the plurality of input channels based on a binary input, a reference voltage output producing the threshold voltage from the selected one of the plurality of input channels as the reference voltage.

14. A circuit according to claim 13, wherein the binary input corresponds to a load connected to the power supply.

15. A circuit according to claim 14, wherein the reference voltage produced at the reference voltage output corresponds to a ground fault threshold voltage of the load connected to the power supply.

16. A lighting system power supply having a secondary ground fault protection, the power supply comprising:

a high voltage transformer having a primary coil and a secondary coil;

a power source connected to the primary coil;

at least one gas discharge tube connected across end terminals of the secondary coil;

a sensing transformer having a sensing transformer primary coil connected between a center tapped midpoint of the secondary coil of the high voltage transformer and an earth ground and a sensing transformer secondary coil having a second center tapped midpoint connected to a digital ground;

sensing circuit means for detecting a ground fault in the power supply, the sensing circuit means connected to the sensing transformer secondary coil; and switch means for disconnecting the power source from the high voltage transformer when a ground fault is detected.

17. A power supply according to claim 16, wherein the ratio of coil turns in the sensing transformer is about 1:1.

18. A power supply according to claim 16, wherein the sensing circuit means further comprises floating ground means for detecting whether the high voltage transformer has a good connection to the earth ground and bad transformer means for detecting whether the sensing transformer is operating properly, the floating ground means and bad transformer means connected to the switch means such that the power source is disconnected from the primary coil when the connection to earth ground is lost or the sensing transformer does not operate properly.

19. A power supply according to claim 16, wherein the sensing circuit means comprises a reference voltage means for producing a reference voltage and voltage comparison means for comparing a fault voltage representing the voltage in the high voltage transformer to the reference voltage and generating a fault output having a value dependent on the result of the comparison.

20. A power supply according to claim 19, wherein the reference voltage means comprises one of an analog switch and a digital-to-analog converter having a plurality of input channels each connected to a threshold voltage source, data input means for selecting one of the plurality of input channels based on a binary input, a reference voltage output producing the threshold voltage from the selected one of the plurality of input channels as the reference voltage.

21. A power supply according to claim 20, wherein the binary input corresponds to a load produced by the at least one gas discharge tube.

22. A power supply according to claim 21, wherein the reference voltage produced at the reference voltage output corresponds to a ground fault threshold voltage of the load.

23. A power supply according to claim 22, wherein when the fault voltage is greater than the reference voltage, the fault output activates the switch means to disconnect the power source.

24. A power supply according to claim 16, wherein the sensing circuit means further comprises floating ground means for detecting whether the high voltage transformer has a good connection to the earth ground and bad transformer means for detecting whether the sensing transformer is operating properly.

* * * * *